United States Patent Office 3,558,191
Patented Jan. 26, 1971

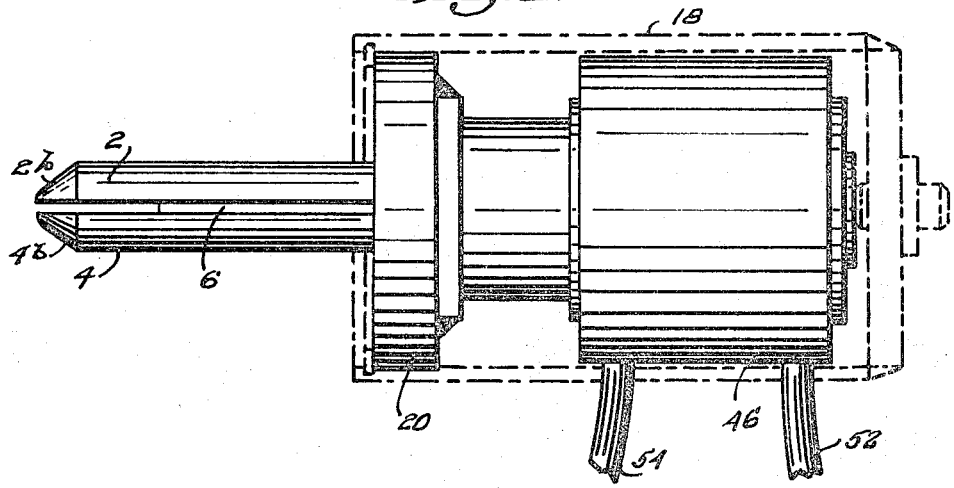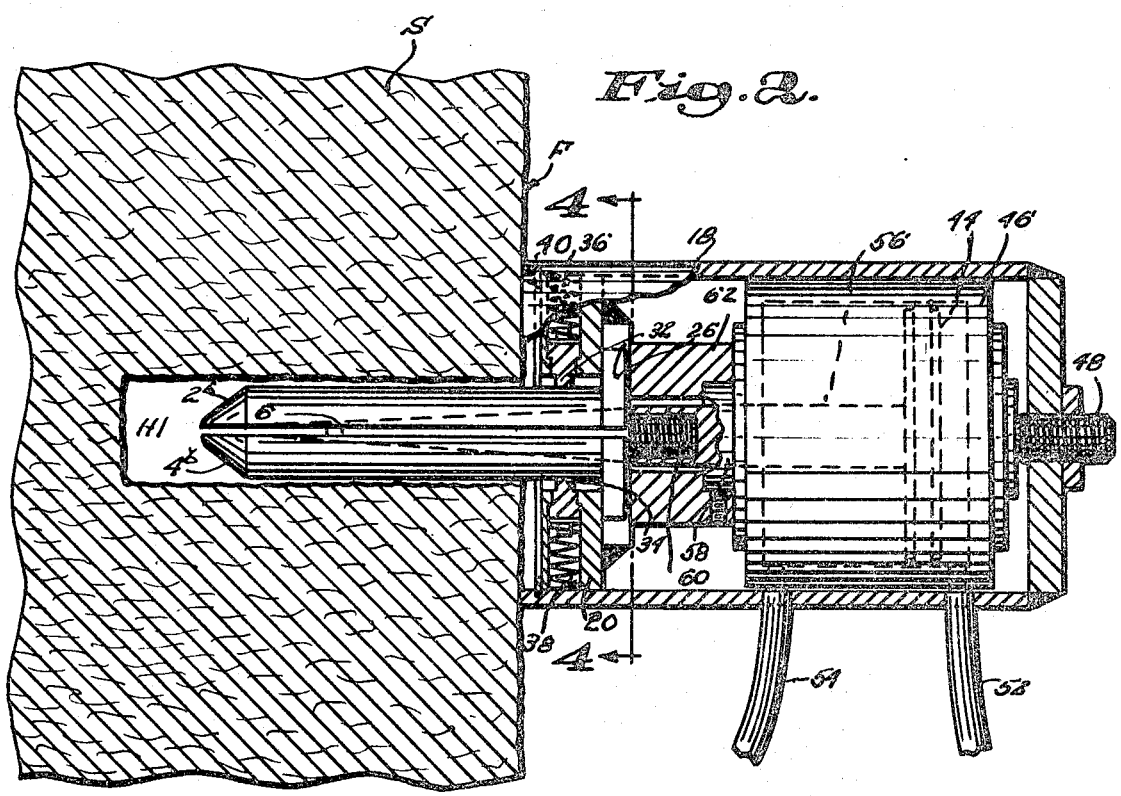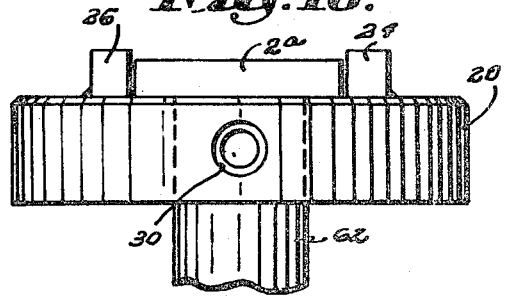

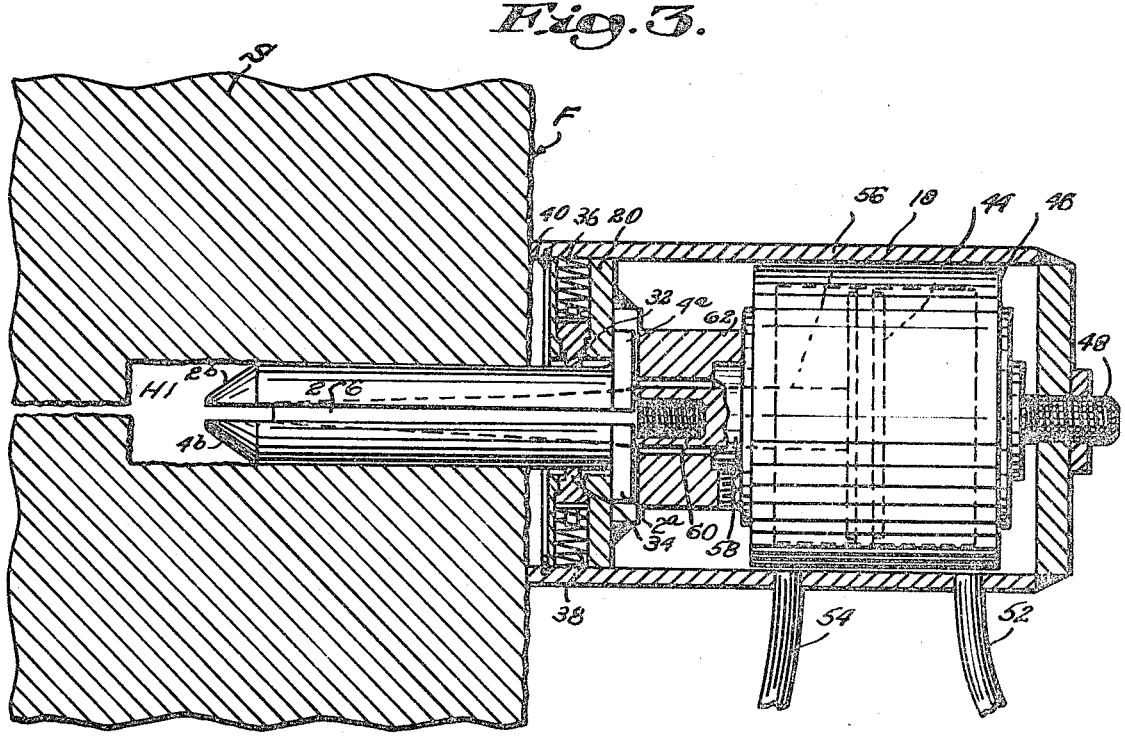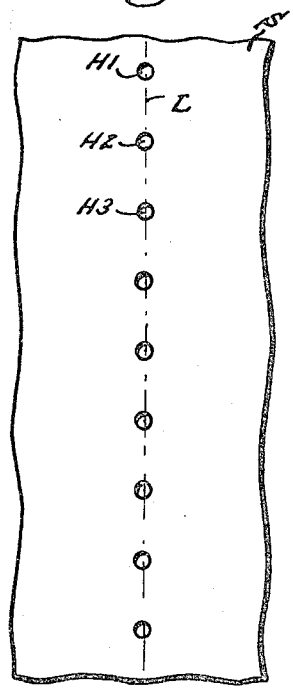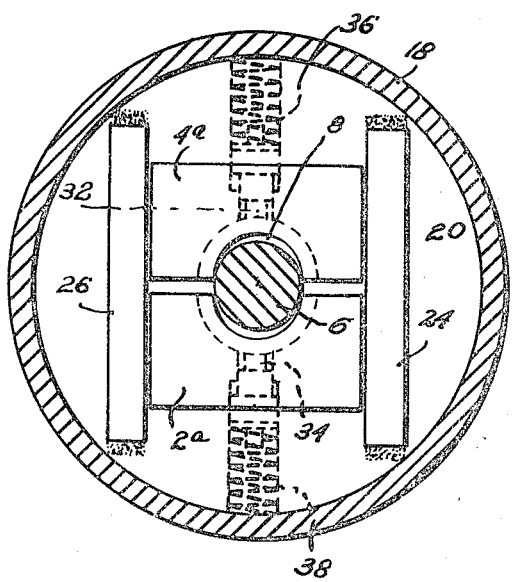

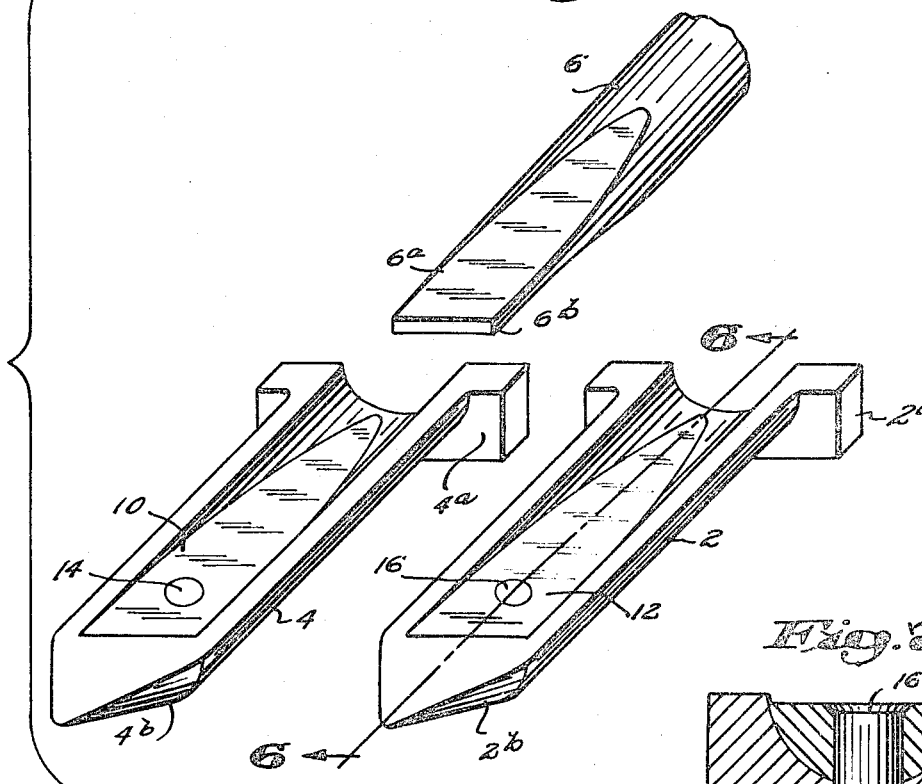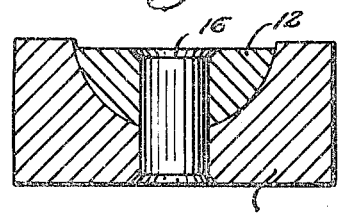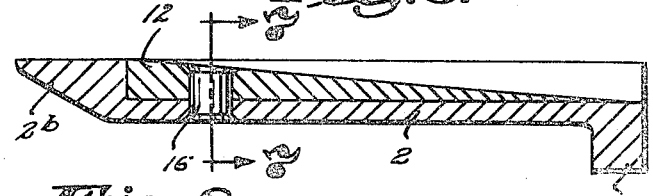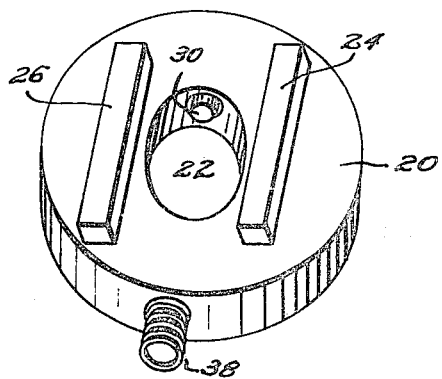

3,558,191
**MEANS FOR APPLYING WEDGING FORCES
TO MINERALS AND OTHER BODIES**
Ralph A. Fletcher, Bedford, N.H., and Joseph R. Oliver, Lowell, Mass., assignors to H. E. Fletcher Co., Westford, Mass., a corporation of Massachusetts
Filed Jan. 23, 1969, Ser. No. 793,348
Int. Cl. E21c 37/04
U.S. Cl. 299—22                    4 Claims

ABSTRACT OF THE DISCLOSURE

Sustained and rapidly augmented wedging forces are applied to a drilled stone body by means of a fluid power-actuated reciprocating wedge apparatus to carry out a controlled and highly effective splitting action. The reciprocating wedge apparatus includes a spring-loaded wedge device, a wedge retaining structure and a driver mechanism for transmitting driving forces to the wedge device. The wedge device is of the plug and feather class in which a pair of wedge feathers and a centrally disposed wedge plug are designed to be located in a drilled hole with the wedge retaining structure and driver mechanism being supported externally of the drilled hole in some convenient manner. The wedge retaining structure resiliently contains the wedge feathers in a normally contracted position against the wedge plug. A fluid power-actuated piston, arranged within the driver mechanism is connected to the wedge plug and operates to force the wedge plug into and out of a wedging position between the pair of resiliently contained wedge feathers. The wedge feathers return to a normally contracted position when the wedge plug is retracted and all parts are removable from the drilled hole as a compact unit which can be employed in successive wedging operations.

---

This invention relates to an improved wedge device employed in producing dimension stone as obtained from a granite quarry, for example, and more particularly the invention is concerned with improved method and means for applying wedging forces to mineral bodies in order to carry out controlled and highly effective splitting action.

Use of wedging devices in the conventional production of dimension stone is usually preceded by several other operations in the granite quarry. One such operation is flame channelling employed to block out a large mass of stone standing in the quarry. A typical flame channelling method is disclosed in Pat. No. 3,019,004. Multi-wire sawing is also employed to separate a blocked out mass of stone into smaller blocks while still standing in the quarry. A wire sawing method of this type is disclosed in Pat. No. 3,180,687.

The partially separated blocks resulting from wire sawing may be required to be further subdivided into still smaller sizes for meeting dimension requirements of varying nature. One desirable method of subdividing is to split the stone by drilling spaced holes along predetermined lines of splitting and driving a series of wedges into the holes. It is customary to employ wedging devices of various types for splitting the stone, and one common type is a composite wedge assembly of the "plug and feather" class made up of a pair of wedge feathers and a centrally disposed wedge plug slidably arranged against one another.

A problem arises in using conventional wedges of the plug and feather type since the component parts are not held together. Therefore, these component parts have to be assembled and tend to fall apart after being used. The parts are also subject to rapid wear and limited working life. The problem of handling and using these plug and feather wedges becomes particularly troublesome where splitting is required to be carried out along a vertical line of splitting in a block or stand of stone since the wedge components, if inserted in horizontally disposed holes, will fall out of the holes as splitting occurs, thus becoming separated and, in some cases, damaged.

A definite need, therefore, exists for an improved form of wedge assembly of the plug and feather type which can be satisfactorily held against a vertical face of a mineral body and which can be moved into and out of a drilled hole without separation of its component parts. In the art, proposals have been made for adjustably securing together plug and feather components but these prior art devices have not been found to be satisfactory and are not in use so far as we are aware.

With the foregoing problems and needs in mind, we have conceived of an improved method of exerting wedging forces in a drilled stone mass, which method is not dependent upon impact forces resulting from a conventional periodic hammering. In our improved method, a pair of semicylindrical wedge feathers are moved into contact with opposite sides of a drilled hole so as to engage the hole throughout their lengths.

We have discovered that by exerting a continuously sustained and very rapidly augmented fluid power-actuated driving force on a wedge plug, acting along substantially the entire inner surfaces of the wedge feathers, we are enabled to carry out a controlled and very effective splitting action suitable for practical application in a granite quarry as well as for other applications.

We have further determined that our improved method may be carried out by means of an improved form of plug and feather wedge assembly which includes a novel driver mechanism together with means for holding the wedge components in adjustably interlocked relationship so that these parts cannot fall away from one another or become separated when the splitting occurs or when the wedge assembly is withdrawn from a drilled hole.

An important object of the invention, therefore, is to provide an improved method of exerting wedging forces and to devise an improved wedge assembly of the plug and feather type for use in splitting mineral bodies.

Another object is to provide an improved reciprocating wedge assembly which includes a driver mechanism and a retaining structure whereby wedge components may be conveniently held and forced into a wedging position and yet retained in adjustably interlocked relationship during both the wedging operation and when the wedge parts are being withdrawn from a drilled hole after splitting occurs.

The nature of the invention and its other objects and novel features will be more fully understood and appreciated from the following description of a preferred embodiment of the invention selected for purposes of illustration and shown in the accompanying drawings, in which:

FIG. 1 is an elevational view illustrating the reciprocating wedge apparatus of the invention;

FIG. 2 is a cross section view showing a rock body with a holed rilled therein and the reciprocating wedge apparatus of FIG. 1 supported within the hole;

FIG. 3 is a view similar to FIG. 2 but illustrating the wedge apparatus in a position to exert wedging forces and produce a break in the rock body;

FIG. 4 is a cross section taken on the line 4—4 of FIG. 2;

FIG. 5 is an exploded view of a novel wedge feather and wedge plug assembly;

FIG. 6 is a cross section taken on the line 6—6 of FIG. 5;

FIG. 7 is a cross section taken on the line 7—7 of FIG. 6;

FIG. 8 is a detail perspective view of a wedge component;

FIG. 9 is a diagrammatic view illustrating a mineral body formed with vertical spaced drilled holes, and;

FIG. 10 is a detail elevational view.

Referring more in detail to the drawings, the parts shown therein generally include a reciprocating wedge assembly, a retaining structure for resiliently supporting the wedge assembly and a driver mechanism for exerting fluid power-actuated driving forces on one of the wedge components.

In one preferred embodiment of the invention method, application of wedging forces to a mineral body is disclosed with reference to a vertical face of a block of granite in a quarry. The invention is also described in detail having reference to exerting wedging forces by means of a single wedge device with it being intended that a plurality of wedge devices may be employed along a vertically extending line of splitting. However, it should be understood that the invention is not limited to use in a vertical face of stone and it may be desired to employ the method and structure of the invention in exerting wedging forces for splitting various mineral masses however disposed as well as displacing other classes of bodies.

In the drawings, the reference character S denotes a mineral mass which may consist of a block of stone such as granite having a vertical face F. L refers to a vertical line of splitting as shown in FIG. 9 along which the block of stone is desired to be separated. As is customary in carrying out the desired splitting operation, a series of vertically spaced holes as H1, H2, H3, etc. are drilled in the block of stone and these holes extend inwardly of the block of stone in a horizontally directed manner as shown in FIGS. 2 and 3.

In accordance with the invention, the wedge apparatus shown in FIG. 1 is employed to exert wedging forces in the holes H1, H2, H3, etc. by engaging the apparatus of FIG. 1 in successive holes or by using a number of units simultaneously.

As noted above, the wedging apparatus illustrated in FIG. 1 includes as principal parts thereof a reciprocating wedge assembly, a retaining structure for holding the wedge assembly, and a driver mechanism for exerting driving forces in the wedge assembly.

Numerals 2 and 4 (FIG. 1) denote wedge feathers which are more clearly shown in FIG. 5 and which are designed to have centrally disposed therebetween a wedge plug 6. The wedge plug 6 comprises a cylindrical part which is formed at one end with a pair of beveled wedge faces 6a and 6b.

As will be noted from an inspection of FIG. 5 the wedge feathers 2 and 4 comprise semicylindrical tubular sections which when placed against one another define a cylindrical opening 8 in which the cylindrical end of wedge plug 6 may be slidably received as shown in FIG. 4. Extending outwardly from the opening 8 are a pair of rectangularly shaped flanges 2a and 4a. The opposite end of the wedge feathers are conically shaped at 2b and 4b and extending away from the conically shaped ends are internal tapered liner parts 10 and 12. The parts 10 and 12 have flat tapering surfaces which are complementary with the surfaces 6a and 6b of wedge plug 6 and these parts vary in thickness with the maximum thickness occurring at points adjacent to the conical ends 2b and 4b.

In the arrangement shown in FIGS. 5, 6 and 7, the tapered part 10 and 12 may be secured by rivets as 14 and 16, or if desired, the two cylindrical sections 2 and 4 may be formed with the tapered ends as integral parts of the sections. It will be apparent that the tapered surface of the wedge plug 6 when advanced between the wedge feathers will engage the tapered surface of the liner parts 10 and 12 and will force the cylindrical sections 2 and 4 apart to thus exert a wedging force.

The wedge assembly components comprised by the members 2, 4 and 6 are resiliently supported against one another in a special retaining structure which includes a cylindrical housing 18 and a wedge retaining collar 20 shown in detail in FIG. 8. Located through the collar is an elliptically shaped opening 22 which is of a size to receive therein the wedge assembly and to permit the wedge feathers to move apart when the wedge plug is forced between the feathers. At either side of the opening 22 are solidly fixed a pair of elongated stops 24 and 26. The stops 24 and 26 are spaced apart a distance such that the flanged portions 2a and 4a of the feathers 2 and 4 may be received and held against rotation as suggested in FIG. 4.

Also provided in the collar 20 are opposite radially extending openings as 30 in which are loosely received a pair of spring-loaded pins 32 and 34 which are adapted to extend through the openings 30. The inner ends of the pins 32 and 34 engage against the wedge feathers 2 and 4 as suggested in FIG. 3 and are attached to coiled springs 36 and 38 one of which is more clearly shown in FIG. 8. The coiled springs are normally held in a compressed position by engagement with the inner peripheral surface of the cylindrical housing 18 as shown in FIGS. 2 and 3. The collar 20 is also releasably held in contact with the flange portions 2a and 4a by means of a resilient lock ring 40 which is forced into a groove formed around the inner periphery of the housing as illustrated in FIGS. 2 and 3.

In combination with the wedg assembly and its retaining structure described, we further provide a driver mechanism which is also contained in the cylindrical housing 18 and which includes a fluid power-actuated piston 44. Piston 44 is mounted for reciprocating movement in a cylinder 46 adjustably secured to the hohsing by a take-up screw 48 located through an end wall 50 of the housing.

Fluid pressure is extended through a power port 52 to drive the piston in one direction and the piston is retracted by fluid flow through a return port 54.

Attached to the piston 44 is a drive rod 56 which extends through a bearing mount 58 and which is threaded over a threaded end 60 of the wedge plug 6 as shown in FIGS. 2 and 3. Surrounding the drive rod 56 is a spacer member 62 secured by a set screw as shown. The spacer member is employed to locate the parts in suitable relationship to one another.

In operation the wedge feathers are entered in a drilled hole with the housing engaged against the face of the drilled stone as suggested, for example, in FIGS. 2 and 3 of the drawings. The wedge plug at this point is in a retracted position. The apparatus is positioned such that the line of separation of the two wedge feathers will coincide approximately with a desired line of splitting as represented by the line L in the drawings. The housing and driving mechanism are supported externally of the stone face by some convenient means such as a frame, hanger, bracket or the like.

With the wedge feathers engaged as described, fluid pressure is exerted to actuate the piston which starts to advance the wedge plug between the wedge feathers. This initiates a wedging force which is continuously sustained while the intensity of the fluid pressure is increased up to a pressure of as great as 2000 pounds, for example. This pressure acts to drive the edge plug inwardly with the wedge feathers being forced apart to exert very large wedging forces. As a result of the sustained and rapidly augmented wedging forces described, there is induced a controlled splitting along a desired line or plane in a manner which is not obtainable with percussive or hammered wedging, and the degree of control and uniformity of plane of splitting through the stone body may be greatly increased and regulated by utilizing a plurality of the wedges in spaced apart holes especially where separated wedging forces are exerted simultaneously.

When a desired splitting action has been accomplished, fluid pressure is reversed on the piston to withdraw the wedge plug and complete reciprocating travel of the wedge plug, and as this occurs, the spring loaded pins act on the wedge feathers to contract these feathers against the wedge plug. All of the wedge components are thus held together and withdrawn as a compact unit which is in a convenient position to be used in another drilling operation without further handling or manipulation. This, it will be observed, is highly advantageous in dealing with vertically spaced holes since the parts do not separate, cannot fall away, and no handling is necessary.

It will be evident from the foregoing disclosure of the invention that we have provided an improved method of exerting wedging forces for splitting mineral bodies and we have devised an improved form of plug and feather wedge which eliminates most of the objectionable features of conventional plug and feather wedges.

In the structure disclosed, means are included for not only forcing wedge components apart, but for also removing the wedge components against resistance forces of considerable magnitude. This may be a distinct advantage in some circumstances.

While we have disclosed the invention specifically with respect to a plug and feather wedge combination with a fluid power-actuated driver mechanism, it should be understood that the invention is not limited to any particular form of wedge, and we may desire to apply the driver mechanism to other wedges and to vary the components used as well as to carry out other changes and modifications in the structure described within the scope of the appended claims.

We claim:

1. A wedge apparatus of the plug and feather type for splitting a mass of stone along a predetermined plane of separation when engaged in a drilled hole in the stone, said wedge apparatus comprising in combination a pair of wedge feathers and a centrally disposed wedge plug slidably located therebetween, a retaining structure for containing the wedge feathers and the wedge plug in contact with one another, driver mechanism for transmitting a driving force to the wedge plug, said driver mechanism consisting in a cylinder and a fluid pressure actuated piston mounted in the cylinder and connected to the said wedge plug, said retaining structure including a cylindrical housing located around the cylinder and fluid actuated piston, each of said wedge feathers comprising a semi-cylindrical tubular section which presents an upper flanged retaining portion and a lower engaging end portion for entering a drilled hole, each of said lower end portions having inner sides thereof recessed to provide annular shoulders, curved liner elements secured against the recessed sides in abutting relation to respective annular shoulders in the end portions, said liner elements presenting inclined surfaces for slidably receiving opposite sides of the wedge plug and being of an angularity which corresponds to the angularity of the wedge plug sides.

2. A structure according to claim 1 in which the transverse wall thickness of each of the tubular sections is substantially constant at intermediate portions of the sections and is of an increased thickness at the portions comprised by the annular shoulder portions.

3. A structure according to claim 2 in which the retaining structure includes a retaining collar formed with an elliptical opening through which the wedge plug and wedge feathers are located, said collar being formed with elongated guide stops constructed and arranged to slidably engage and guide respective upper retaining flange portions to the wedge feathers.

4. A structure according to claim 3 in which the retaining collar is formed with plunger openings located radially through the collar and communicating with the said plug and feather retaining openings, resiliently contained plunger means in said plunger openings for yieldably engaging and supporting the said wedge feathers at two diametrically opposite sides of the collar.

References Cited

UNITED STATES PATENTS

| 2,032,899 | 3/1936 | Zahner | 299—23 |
| 2,517,267 | 8/1950 | Watson | 299—23X |
| 3,414,328 | 12/1968 | Darda | 299—22 |

FOREIGN PATENTS

| 386,027 | 12/1923 | Germany | 299—22 |

ERNEST R. PURSER, Primary Examiner

U.S. Cl. X.R.

299—23